United States Patent Office 3,520,786
Patented July 14, 1970

3,520,786
PREPARATION OF CYCLOALKANES
Mahmoud R. Rifi, Kendall Park, N.J., assignor to Union Carbide Corporation, a corporation of New York
No Drawing. Filed Dec. 29, 1966, Ser. No. 605,595
Int. Cl. B01k 3/00
U.S. Cl. 204—59    11 Claims

ABSTRACT OF THE DISCLOSURE

Cyclopropane, cyclobutane and derivatives thereof are readily prepared in high yields by the electrolytic cyclization of, respectively, 1,3-dihalopropane and 1,4-dihalobutane compositions by a D.C. voltage of at least 1.5 volts. Higher cycloalkanes can be similarly prepared.

---

This invention relates to the preparation of cycloalkanes. More particularly this invention relates to the preparation of cycloalkanes from haloalkanes.

Cyclopropanes and cyclobutanes are widely used in the anesthetic field. A number of steroid and biologically active compounds contain the cyclopropane moiety. Terpenes, which are used in perfumes, also contain cyclopropyl groups.

Cyclopropane (or substituted cyclopropane) is conventionally prepared from the reaction of metals such as zinc or sodium on 1,3-dihalopropanes. For example, zinc is contacted with 1,3-dihalopropane in an alcoholic solution and in the presence of iodine at about 200° C. to prepare cyclopropane. Although, cyclopropane can be readily prepared by the above method, the reaction must be conducted at high temperatures (about 200° C.) as opposed to room temperature. Moreover, the yield of the product, cyclopropane, is frequently less than 90%. In addition the preparation of substituted cyclopropane is often impeded in that the chemical reducing agents commonly employed tend to attack some of the substituents, for example, other halogens, on the straight chain precursor.

Cyclobutane (and substituted cyclobutane) is more difficult to prepare. This cyclic compound, normally prepared by the reaction of metals such as zinc and sodium on the corresponding 1,4-dihalobutanes is produced in relatively poor yields. For example, treatment of 1,4-dihalobutane with molten sodium in toluene solvent at about 110° C. affords cyclobutane in only about 5 to 7% yield.

Thus preparative procedural problems have, up to now, impeded the preparation of cyclopropane, cyclobutane and many derivatives thereof.

Accordingly, it is an object of the present invention to provide a simple and direct procedure for preparing cycloalkanes and derivatives thereof.

This and other objects of the present invention are in general accomplished by the electrochemical cyclization of haloalkanes, including $\alpha,\omega$-dihaloalkanes, to the corresponding cycloalkanes. More specifically, it has now been discovered that passing a direct current through a suitable solution of a haloalkane at a voltage sufficient to reduce the carbon-halogen bonds thereof results in the evolution of halogen and the formation of the corresponding cycloalkane. Such voltage is preferably 1.5 volts to 6.0 volts or more. However, a lesser voltage than 1.5 volts can be used where desired within the scope of the invention.

The process of the present invention in general is that substituted cycloalkanes having 3 to 6 ring carbon atoms can be prepared including alkyl and aryl cycloalkanes particularly alkyl and aryl cyclopropanes and cyclobutanes as well as spiropentanes (from pentaerythritol halides). Moreover, using controlled potential electrolysis, one can prepare halogenated cyclic compounds, e.g., chlorocyclopropane can be prepared by the electrolysis of 1-chloro-1,3-dibromopropane. Other halogenated cycloalkanes can be similarly prepared. However, it should be noted that the reactivity or ease of cleavage of the various halogen radicals from the attached carbon atom varies in descending order, from iodine, which is the easiest to cleave, i.e., requires less voltage, to bromine, to chlorine, to fluorine which is the least easy to cleave and requires the most voltage. Thus in preparing halogenated cyclic compounds from halogenated alkanes, the halides to be cleaved must be above the remaining halide substituents in reactivity or ease of cleavage. Accordingly, by the process of the present invention, one can select the halogen to be cleaved and those to be retained by controlling the potential to a level sufficient to cleave certain halogens and low enough to retain other halogen substituents in accord with the order of reactivity of the halogens outlined above. For example, to form 1,2,3-trifluorocyclopropane, the starting material is suitably 1,2,3-trifluoro-1,3-dichloropropane since the chlorine radicals can be cleaved by electrolysis at a potential controlled below the cleavage potential of fluorine. Similarly, 1,2,3-tribromocyclopropane can be prepared from 1,2,3-tribromo-1,3-diiodopropane. However, 1,2,3-tribromocyclopropane cannot be prepared by electrolysis of 1,2,3-tribromo-1,3-dichloropropane since the bromine radicals cleave at a lesser voltage than chlorine and would be cleaved first. It is to be noted that in cases where a compound has more than one reducible site, for example, where an alkane has several different halogen substituents, the preparation of cycloalkanes by conventional chemical routes is difficult. However, as discussed above, the application of controlled potential electrolysis is independent of the number of reducible sites in a compound and the desired cycloalkane can readily be prepared.

It is not necessary for the formation of a cycloalkane that the two halogens to be cleaved by the same, i.e., one can obtain cyclopropane from the electrolysis of 1-bromo-3-chloropropane. Moreover, it is not necessary that at least two halogens be present in the alkane starting material. It is sufficient for the process of the present invention that one halogen substituent and one other substituent be attached to the alkane starting material, such as, a quaternary ammonium salt or a tosylate group which groups, in general, will not be cleaved until after the halogen substituent is cleaved. By a quaternary ammonium salt, as defined herein, is meant a substituent having the formula ($-NR_3X$) where R is alkyl having 1 to 10 carbon atoms and hydrogen and X is a halogen. For example, 3-bromopropyl triethylammonium bromide upon electrolysis at about 2.0 volts is converted to cyclopropane. The above type of reaction is not limited to alkane substituents such as quaternary ammonium salt and a tosylate group but any readily cleavable group, which reduces at a higher voltage than that necessary to cleave a carbon-halogen bond, can be incorporated into the alkane starting material.

In a typical preparation, 3 parts of 1,3-dibromopropane is dissolved in 20 parts of dimethylformamide which has been previously saturated with lithium bromide. This solution is contacted with a cathode consisting of a mercury pool in a compartment. The anode, a Nichrome wire mounted in a compartment, interconnected with the first compartment by way of a channel, is immersed in dimethylformamide and lithium bromide solution. The anode and cathode are ionically connected, i.e., a semipermeable barrier is placed in the channel between the anode and cathode solutions which permits only the passage of halide (here bromide) ions therethrough from the cathode solution to the anode solution. A D.C. voltage is applied at a level of at least 1.5 volts. Throughout the reaction, nitrogen is sprayed through the cathode zone to carry the cyclopropane into a cold trap to insure high purity of product. Quantitative yields of cyclopropane can then be realized.

The foregoing haloalkanes are employed in solution in carrying out the above process. Suitable solvents are those which dissolve the starting material, and which dissolve electrolytes. A further requirement is that the solvent does not reduce at a more negative potential than that required to reduce the aforementioned carbon-hydrogen bonds, i.e., a solvent having a half-wave potential of, for example, at least 1.5 volts. Specific examples of suitable solvents such as amides, dimethylformamide, ketones, e.g., acetone and cyclohexanones, nitriles such as acetonitriles and dimethyl sulfoxide and dimethyl sulfolane. Water can be present, at least in part, provided the reactant employed will dissolve therein.

To render the solvent electrically conductive an electrolyte is added. These materials are not narrowly critical; all that is required is that the material be an ionizable salt which, as with the solvent, does not reduce at a more negative voltage than the voltage required to reduce the above-mentioned carbon-halogen bonds i.e., a salt having a half-wave potential above, for example, 1.5 volts. Both inorganic and organic salts can be used. Preferred are halide salts of alkali and alkaline earth metals such as KCl, MgCl$_2$, LiCl, KBr, LiBr, NaBr and NaCl. Persulfate salts such as the metal persulfate salts of alkali metals e.g., sodium, potassium or lithium can also be employed. Among organic salts there are quaternary ammonium salts such as tetramethyl- or tetraethylammonium chlorides.

Once the haloalkane reactant is dissolved in the polar solvent containing dissolved electrolyte, the reaction is effected by passing a direct current through the solution.

Temperature is in no respect critical to the reaction with wide extremes e.g. −78° C. and 200° C. being suitable. Room temperature e.g., 25° C. of course is simplest and is highly preferred. Pressure is of no consequence in the reaction other than to prevent solvent evaporation if desired.

The materials used to make the electrodes are not critical. In general the anode can be fabricated of any electron acceptor, e.g., any metal or amphoteric substance such as carbon. The cathode, conversely, can be any electron carrier i.e., any metal.

The current employed must be direct current (D.C.). A rectified alternating source is satisfactory. The minimum voltage required to effect the reaction is, as discussed above, the voltage needed to break the carbon-halogen bonds. There is no theoretical maximum voltage provided the solvent and supporting electrolyte do not electrolize.

The following examples serve to illustrate the present invention but are not intended as a limitation or restriction thereof. All parts and percentages are by weight unless otherwise stated.

EXAMPLE I

Cyclopropane having the formula

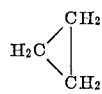

was prepared from 1,3-dibromopropane as follows:

About 50 grams of 1,3-dibromopropane was dissolved at room temperature in 1000 ml. of dimethylformamide which had been previously saturated with lithium bromide. This solution was introduced to a cathode compartment consisting of a mercury pool in a vessel. The anode, a Nichrome wire mounted in an ionically interconnected vessel, was immersed in dimethylformamide and lithium bromide solution. A D.C. voltage was applied to produce a cathode voltage of between 1.8 to 3.0 volts and the product cyclopropane, was formed in the cathode compartment. Nitrogen was concurrently passed through the cathode solution to carry the cyclopropane into a cold trap for recovery. A yield of product, cyclopropane in excess of 85% of the theoretical was obtained in about 6 hours.

The above reaction time is shortened, however, by increasing the above cathode voltage which allows more current to pass through the cell. Thus the above yield of product is obtained in about 3 hours where the cathode voltage is adjusted to about 60 volts.

EXAMPLE II

Cyclobutane having the formula

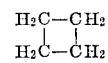

was prepared from 50 grams of 1,4-dibromobutane by the same procedure described in Example I. The yield obtained was 25% cyclobutane and 75% n-butane.

It can be seen that by the method of the invention cycloalkanes can readily be produced in high yields from the corresponding haloalkanes. Thus, 1,3-cyclopropane and derivatives thereof can be produced by the present method in yields up to 100% of the theoretical while 1,4-cyclobutane and derivatives thereof can be produced in yields up to 25% or more.

What is claimed is:

1. Process for preparing cycloalkanes having 3 to 6 ring carbon atoms inclusive which comprises the electrolytic cyclization of haloalkane compositions represented by the formula

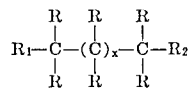

where R is selected from the group consisting of alkyl having from 1 to 10 carbon atoms, aryl, alkaryl, hydrogen and halogen, R$_1$ is halogen and R$_2$ is selected from the group consisting of halogen, quaternary ammonium salts and a tosylate group and x is an integer having a value from 1 to 4, by passing a direct current at a potential of at least 1.5 volts through a solution containing said composition and an ionizable salt electrolyte dissolved in an inert solvent therefor, said solution being maintained at a temperature between −78° C. and 200° C. and isolating the corresponding cycloalkaline.

2. The process of claim 1 wherein cyclopropane is prepared from 1,3-dihalopropane.

3. The process of claim 1 wherein cyclopropane is prepared from 3-bromopropyltriethylammonium bromide.

4. The process of claim 1 wherein cyclobutane is prepared from 1,4-dihalobutane.

5. The process of claim 1 wherein cyclobutane is prepared from 4 bromobutyl tosylate.

6. The process of claim 1 wherein the electrolyte and the solvent each have a half-wave potential of at least 1.5 volts.

7. The process of claim 1 wherein the electrolyte is a lithium halide and the solvent is dimethylformamide.

8. The process of claim 1 wherein an inert gas is continuously passed through said solution to sweep the thus formed cycloalkane out of said solution for recovery in a cold trap.

9. Process for preparing cyclopropane having the formula

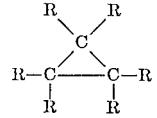

where R is selected from the group consisting of alkyl having from 1 to 10 carbon atoms, aryl, alkaryl, hydrogen and halogen, which comprises the electrolytic cyclization of 1,3-dihalopropane represented by the formula

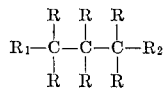

where R is as indicated above and $R_1$ is halogen and $R_2$ is selected from the group consisting of halogen, quaternary ammonium salts and a tosylate group by passing a direct current at a potential of at least 1.5 volts through a solution containing said composition and an ionizable salt electrolyte dissolved in an inert solvent therefor, said solution being maintained at a temperature between —78° C. and 200° C. and isolating the corresponding cycloalkane.

10. Process for preparing cyclobutane having the formula

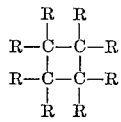

where R is selected from the group consisting of alkyl having from 1 to 10 carbon atoms, aryl, alkaryl, hydrogen and halogen, which comprises the electrolytic cyclization of 1,4-dihalobutane represented by the formula

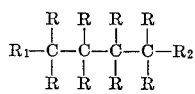

where R is as indicated above, $R_1$ is halogen and $R_2$ is selected from the group consisting of halogen, quaternary ammonium salts and a tosylate group by passing a direct current at a potential of at least 1.5 volts through a solution containing said composition and an ionizable salt electrolyte dissolved in an inert solvent therefor, said solution being maintained at a temperature between —78° C. and 200° C. and isolating the corresponding cycloalkane.

11. Process for preparing cycloalkanes having 3 to 4 ring carbon atoms inclusive which comprises the electrolytic cyclization of haloalkane compositions represented by the formula

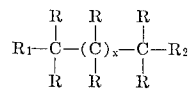

where R is selected from the group consisting of alkyl having from 1 to 10 carbon atoms, aryl, alkaryl, hydrogen and halogen, $R_1$ is halogen and $R_2$ is selected from the group consisting of halogen, quaternary ammonium salts and a tosylate group and $x$ is an integer having a value from 1 to 4, by passing a direct current at a potential of at least 1.5 volts through a solution containing said composition and an ionizable salt electrolyte dissolved in an inert solvent therefor, said solution being maintained at a temperature between —78° C. and 200° C. and isolating the corresponding cycloalkane.

References Cited

UNITED STATES PATENTS 3,274,081  9/1966  Pearlson _____ 204—59

FOREIGN PATENTS 879,057  10/1961  Great Britain.

HOWARD S. WILLIAMS, Primary Examiner